(12) United States Patent
Hu

(10) Patent No.: US 11,082,603 B2
(45) Date of Patent: Aug. 3, 2021

(54) TERMINAL, FOCUSING METHOD AND APPARATUS, AND COMPUTER READABLE STORAGE MEDIUM

(71) Applicant: BEIJING XIAOMI MOBILE SOFTWARE CO., LTD., Bejing (CN)

(72) Inventor: Xiankun Hu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/556,597

(22) Filed: Aug. 30, 2019

(65) Prior Publication Data
US 2020/0186722 A1 Jun. 11, 2020

(30) Foreign Application Priority Data
Dec. 11, 2018 (CN) .......................... 201811511985.9

(51) Int. Cl.
*H04N 5/232* (2006.01)
*G01S 13/32* (2006.01)
*G01S 13/86* (2006.01)

(52) U.S. Cl.
CPC ....... *H04N 5/232121* (2018.08); *G01S 13/32* (2013.01); *G01S 13/867* (2013.01); *H04N 5/23293* (2013.01)

(58) Field of Classification Search
CPC .......... H04N 5/232121; H04N 5/23293; G01S 13/32; G01S 13/867; G01S 13/34; G02B 7/40; G03B 13/20
See application file for complete search history.

(56) References Cited

U.S. PATENT DOCUMENTS

| 4,534,629 | A | | 8/1985 | Bogle et al. |
| 5,847,677 | A | * | 12/1998 | McCorkle ............. G01S 13/222 342/204 |
| 2015/0242982 | A1 | * | 8/2015 | Choi ................. H04M 1/72522 382/106 |
| 2017/0085771 | A1 | * | 3/2017 | Schwager ............ H04N 5/2352 |
| 2020/0066236 | A1 | * | 2/2020 | Giusti ..................... G01S 7/417 |

FOREIGN PATENT DOCUMENTS

DE 197 49 167 A1 6/1998
DE 10 2015 110 717 A1 1/2017

OTHER PUBLICATIONS

Extended European Search Report dated Mar. 2, 2020 in Patent Application No. 19194991.6, citing documents AA, AB, AO and AP therein, 8 pages.

* cited by examiner

*Primary Examiner* — Nhan T Tran
(74) *Attorney, Agent, or Firm* — Oblon, McClelland, Maier & Neustadt, L.L.P.

(57) ABSTRACT

The present disclosure relates to a terminal, a focusing method and apparatus. The terminal includes a ranging radar configured to obtain a reference distance between a target object to be focused and a camera module, wherein an antenna radiation angle of the ranging radar covers a viewing angle of the camera module, and wherein the camera module is configured to adjust a photographing focus of the camera module to a position where the target object is located based on the reference distance.

11 Claims, 12 Drawing Sheets a reference distance between a target subject to be focused and a camera component provided in the terminal is detected by employing a ranging radar provided in the terminal — 201 a photographing focus of the camera module is adjusted to a position where the target subject locates according to the reference distance — 202

FIG. 2A

TERMINAL, FOCUSING METHOD AND APPARATUS, AND COMPUTER READABLE STORAGE MEDIUM

CROSS-REFERENCE TO RELATED APPLICATIONS

The present application is based upon and claims priority to Chinese Patent Application No. 201811511985.9, filed on Dec. 11, 2018, the entire contents of which are incorporated herein by reference.

TECHNICAL FIELD

The present disclosure relates to the field of terminal control technologies, and more particularly to a terminal, a focusing method, a focusing apparatus, and a computer readable storage medium.

BACKGROUND

With the rapid development of the electronic technology and the image processing technology, a photographing function of a terminal has become increasingly stronger. During a photographing process, in order to photograph a high-resolution image, there is a need to perform focusing according to a target object to be photographed, that is, a position of the lens is adjusted according to the target object so as to acquire a clear and focused image.

An infrared laser sensor may be provided near a rear camera of the terminal. When a user needs to photograph a clear image of the target object, the camera may be turned on and the terminal may be moved continuously until the image of the target object locates at the center of a camera preview collected by the camera of the terminal. By this time, the infrared laser sensor sends a low-power infrared laser along a center axis of the camera. The terminal may determine a distance between the target object and the camera by receiving a reflected infrared laser formed by the target object reflecting the infrared laser, and then adjust the position of the lens in the camera according to the distance, such that the camera focuses on the target object, thus photographing the clear image of the target object.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a terminal that includes a ranging radar configured to obtain a reference distance between a target object to be focused and a camera module, wherein an antenna radiation angle of the ranging radar covers a viewing angle of the camera module, and wherein the camera module is configured to adjust a photographing focus of the camera module to a position where the target object is located based on the reference distance.

In an example, a distance between the ranging radar and the camera module is less than or equal to a preset distance threshold.

In another example, the ranging radar is a millimeter wave radar, and the millimeter wave radar is configured to send a radar signal via a frequency modulation continuous wave.

In yet another example, a frequency of the radar signal sent by the ranging radar is greater than or equal to 20 Hz, and less than or equal to 70 Hz.

In yet another example, a bandwidth of the radar signal sent by the ranging radar is less than or equal to 3 Hz.

Aspects of the disclosure also provide a method for focusing, applied to a terminal. The method includes detecting a reference distance between a target object to be focused and a camera module provided in the terminal by employing a ranging radar provided in the terminal; and adjusting a photographing focus of the camera module to a position where the target object is located based on the reference distance.

According to an aspect, when detecting the reference distance, the method further includes determining the target object in a camera preview image displayed in the terminal; and detecting the reference distance between the target object and the camera module by employing the ranging radar based on a position where the target object is located in the camera preview image.

According to another aspect, when determining the target object in the camera preview image, the method further includes detecting whether a click operation is received in response to displaying the camera preview image; and determining an object corresponding to a click position of the click operation in the camera preview image as the target object in response to receiving the click operation.

According to yet another aspect, when detecting the reference distance, the method further includes determining an azimuthal angle of the target object relative to the camera module based on the position where the target object is located in the camera preview image; and detecting the reference distance between the target object and the camera module by employing the ranging radar based on the azimuthal angle of the target object relative to the camera module.

Aspects of the disclosure also provide an apparatus for focusing. The apparatus includes a processor and a memory storing instructions executable by the processor. The processor is configured to detect a reference distance between a target object to be focused and a camera module provided in a terminal by employing a ranging radar provided in the terminal; and adjust a photographing focus of the camera module to a position where the target object is located based on the reference distance.

Aspects of the disclosure also provide a non-transitory computer-readable storage medium having instructions stored thereon, which when executed by a processor of a terminal, cause the terminal to detect a reference distance between a target object to be focused and a camera module provided in a terminal by employing a ranging radar provided in the terminal; and adjust a photographing focus of the camera module to a position where the target object is located based on the reference distance.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

FIG. 2A illustrates a flow chart of a focusing method according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The technical solution in aspects of the present disclosure relates to a terminal. The terminal may be a phone, a table computer, a personal computer and other devices having a photographing function, which is not limited in aspects of the present disclosure. In the related art, a distance between a target object to be focused and a camera module of the terminal is detected by using an infrared laser sensor. In this case, the terminal needs to be moved such that an image of the target object to be focused can locate at a center of a camera preview image photographed by the lens, so as to be detected, thus causing an inflexible focusing photographing and a poor practicability. In addition, there is a short focusing distance when the infrared laser sensor detects the distance between the target object and the camera module of the terminal. When the target object is far away from the camera module of the terminal, a focusing photographing for the target object may not be performed, causing a poor experience of the user. In the technical solution in aspects of the present disclosure, the ranging radar provided in the terminal may determine the reference distance between the target object and the camera module fast and accurately, such that the terminal may employ the reference distance to perform focus adjustment, thus improving accuracy and efficiency of the focus adjustment. At the same time, the ranging radar may measure a reference distance between the camera module and any object within a viewing angle range of the camera module. Therefore, the terminal may perform focusing on any object within the viewing angle range, thus improving flexibility and practicability of focusing.

Figure 1A:
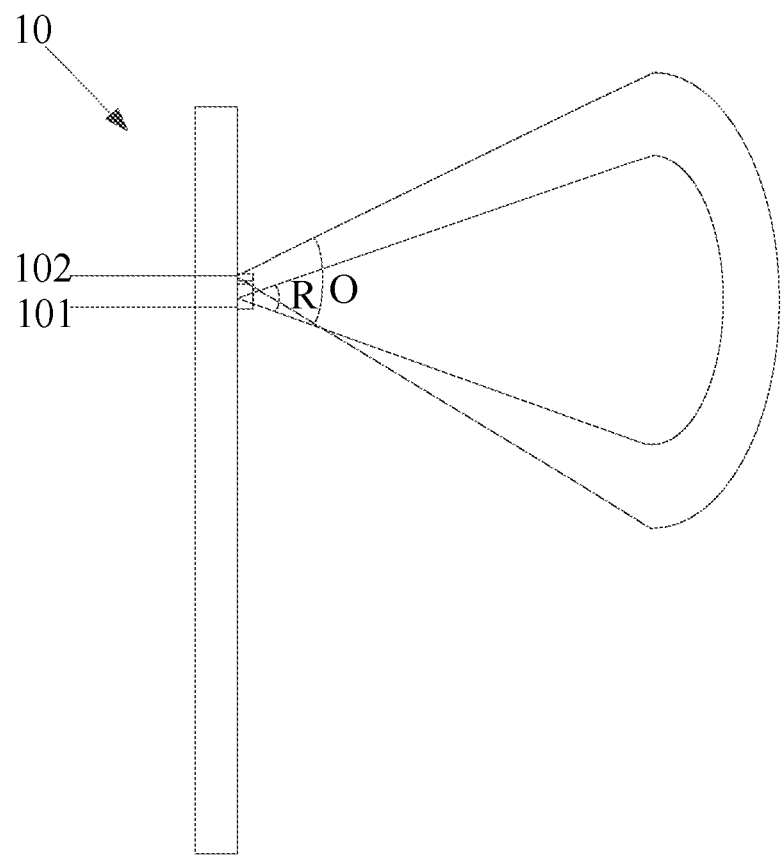
FIG. 1A illustrates a schematic diagram of a terminal according to an exemplary aspect of the present disclosure.

Aspects of the present disclosure provide a terminal 10. As illustrated in FIG. 1A, the terminal 10 includes a camera module 101 and a ranging radar 102. An antenna radiation angle R of the ranging radar 102 covers a viewing angle Q of the camera module 101.

The ranging radar 102 is configured to obtain a reference distance between a target object to be focused and the camera module.

The camera module 101 is configured to adjust a photographing focus of the camera module to a position where the target object locates according to the reference distance.

For example, when disposing the ranging radar 102, it may be determined whether the antenna radiation angle R of the ranging radar 102 covers the viewing angle Q of the camera module 101 firstly according to a position and a shape of an antenna of the ranging radar 102. When the antenna radiation angle R of the ranging radar 102 does not entirely cover the viewing angle Q of the camera module 101, the position and the shape of the antenna of the ranging radar 102 may be adjusted until the antenna radiation angle R of the ranging radar 102 entirely covers the viewing angle Q of the camera module 101.

Figure 1B:
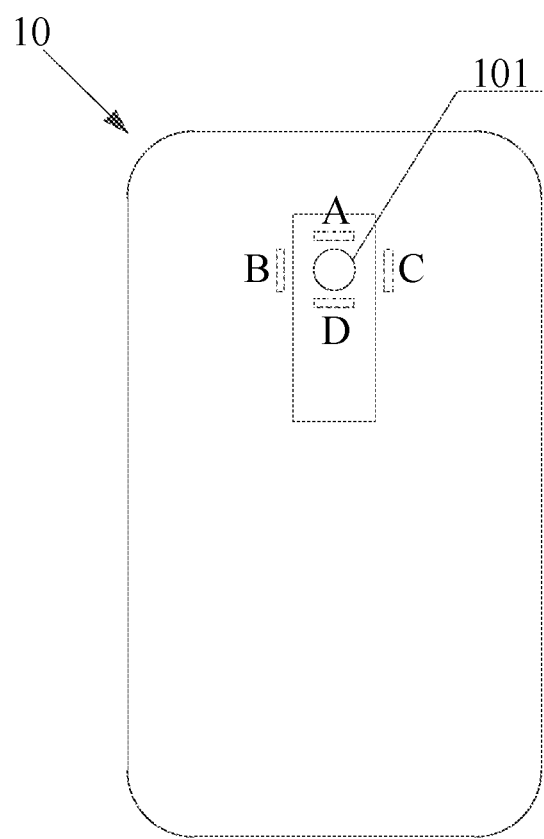
FIG. 1B illustrates a schematic diagram of a position of a ranging radar according to an exemplary aspect of the present disclosure.
Figure 1C:
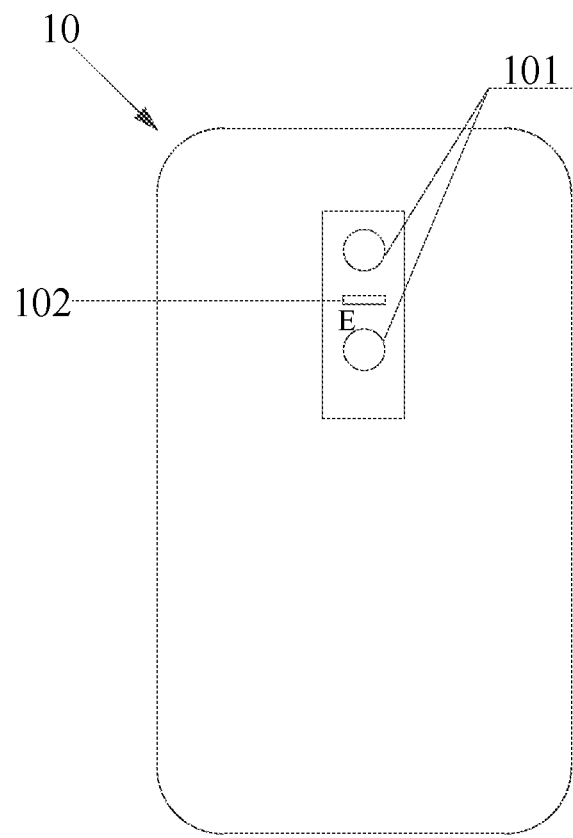
FIG. 1C illustrates a schematic diagram of a position of a ranging radar according to an exemplary aspect of the present disclosure.

Alternatively, in order to ensure that the antenna radiation angle R of the ranging radar 102 covers the viewing angle Q of the camera module 101, the ranging radar 102 may be arranged nearby the camera module 101, that is, a distance between the ranging radar 102 and the camera module 101 is lower than or equal to a preset distance threshold. The preset distance threshold may be determined according to the viewing angle Q of the camera module 101, which is not limited in aspects of the present disclosure. In detail, when there is one camera module 101 provided in the terminal 10, as illustrated in FIG. 1B, the ranging radar 102 may be arranged at the position A, the position B, the position C or the position D illustrated in FIG. 1B. When there are a plurality of camera modules 101 provided in the terminal 10, the ranging radar 102 may be arranged at a symmetric center of the plurality of camera modules 101. Taking two camera modules 101 provided in the terminal 10 as an example, as illustrated in FIG. 1C, the ranging radar 102 may be arranged between the two camera modules 101, that is, at the position E illustrated in FIG. 1C.

Alternatively, the ranging radar 102 may be a millimeter wave radar, and the millimeter wave radar sends a radar signal in a frequency modulation continuous wave. The frequency of the radar signal may be greater than or equal to 20 Hz, and lower than or equal to 70 Hz. A bandwidth of the radar signal may be lower than or equal to 3 Hz. Employing the above millimeter wave radar to detect the reference distance between the target object and the camera module 101 may decrease a detection error to ±3 cm when the reference distance is in a range of 2 to 30 meters, and the detection may be with sub-millimeter precision when the reference distance is in a range of 1 to 2 meters.

In the technical solution in aspects of the present disclosure, the ranging radar 102 provided in the terminal 10 may determine the reference distance between the target object and the camera module 101 fast and accurately, such that the terminal may use the reference distance to perform focus adjustment, thus improving accuracy and efficiency of the focus adjustment. At the same time, the ranging radar 103 may measure a reference distance between the camera module 101 and any object within a viewing angle range of the camera module. Therefore, the terminal 10 may perform focusing on any object within the viewing angle range, thus improving flexibility and practicability of focusing.

FIG. 2A illustrates a flow chart of a focusing method according to an exemplary aspect of the present disclosure. The method is applied to the terminal 10 according to any of the above aspects. As illustrated in FIG. 2A, the focusing method includes acts in blocks 201 to 202 as described in followings.

At block 201, a reference distance between a target object to be focused and a camera module provided in the terminal is detected by employing a ranging radar provided in the terminal.

For example, the terminal may firstly determine the target object to be focused in a camera preview image displayed by the terminal, and then the reference distance between the target object and the camera module provided in the terminal may be detected by employing the ranging radar according to a position of the target object in the camera preview image.

In detail, when the user needs to perform focusing photographing on the target object, the camera module in the terminal is firstly instructed to be turned on. At the same time, the terminal displays an image collected by the camera module, that is, the camera preview image is displayed. Then the user moves the terminal such that the target object enters in the viewing angle range of the camera module in the terminal, that is, an image of the target object is displayed in the camera preview image. After that, the user may instruct the target object to be focused in the camera preview image. Alternatively, when the terminal displays the camera preview image, it may be detected in real time whether a click operation is received. The user may touch or click at the position displaying the target object image in the camera preview image after moving the terminal such that the image of the target object moves to an expectation position in the camera preview image. When the terminal detects the click, it is determined that the click operation is obtained, and an object at a click position corresponding to the click operation in the camera preview image is determined as the target object. Then, the terminal may determine an azimuthal angle of the target object relative to the camera module according to the position where the target object locates in the camera preview image, such that the reference distance between the target object and the camera module is detected by employing the ranging radar according to the azimuthal angle of the target object relative to the camera module.

Figure 2B:
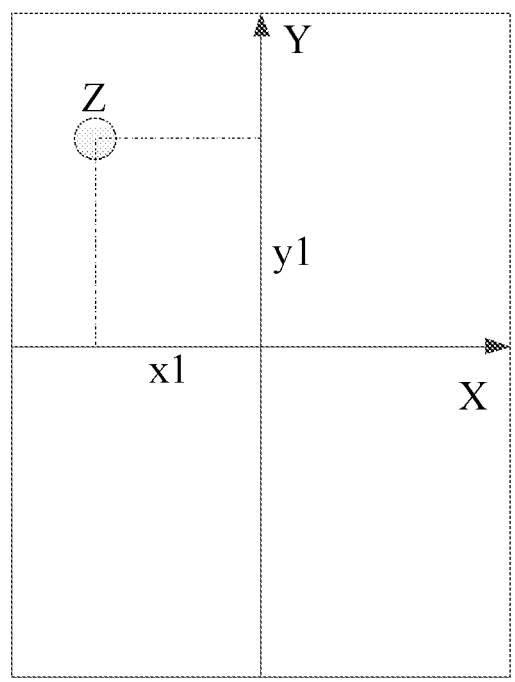
FIG. 2B illustrates a schematic diagram of a coordinate system in a camera preview image according to an exemplary aspect of the present disclosure.
Figure 2C:
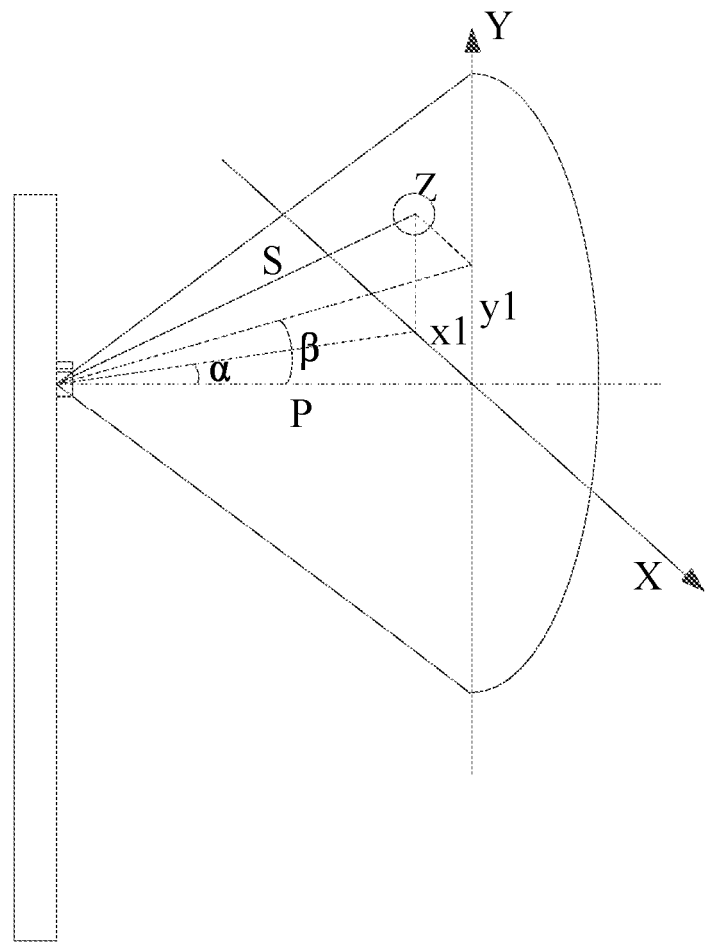
FIG. 2C illustrates a schematic diagram of an azimuthal angle according to an exemplary aspect of the present disclosure.

For example, as illustrated in FIG. 2B, after a target object Z is determined according to the received click operation, the terminal may firstly establish a coordinate system with a center of the camera module in the terminal. Coordinate axis of the coordinate system is illustrated as axis X and axis Y in FIG. 2B. A coordinate (x1, y1) that the image of the target object Z is in the coordinate system is determined. Then, height H and width W of a real scene corresponding to the camera preview image are determined. As illustrated in FIG. 2C, a viewing angle F of the camera along the axis X and a viewing angle G of the camera along the axis Y are determined by nature of the camera module itself, that is, the viewing angle F of the camera along the axis X and the viewing angle G of the camera along the axis Y are known angles in all cases. Therefore, it is assumed that a distance between an image plane where the target object Z locates and the terminal is P, thus $$\tan(G/2) = \frac{Y/2}{P} = \frac{Y}{2P}.$$

It may be deduced that $$P = \frac{Y}{2\tan(G/2)}.$$

A line connecting the target object Z and a center of the camera module is marked as S. The line S is respectively mapped to plane X and plane Y. Thus, an angle between the plane X and a line mapped to the plane Y from the line S is an azimuthal angle α of the target object Z relative to the plane X, and an angle between the plane Y and a line mapped to the plane X from the line S may be an azimuthal angle β of the target object Z relative to the plane Y. The plane X may be formed by the axis X and a central axis of the camera module. The plane Y may be formed by the axis Y and the central axis of the camera module. It may be known from FIG. 2C that $$\tan \alpha = \frac{y1}{P}.$$

Since $$P = \frac{Y}{2\tan(G/2)},$$

it may be deduced that $$\tan \alpha = \frac{y1}{\frac{G}{2\tan(G/2)}} = 2\tan(G/2)y1/Y.$$

Based on the same deduction, since $$\tan(F/2) = \frac{X/2}{P} = \frac{X}{2P},$$

it may be deduced that $$P = \frac{X}{2\tan(F/2)}.$$

As illustrated in FIG. 2C, $$\tan \beta = \frac{x1}{P},$$

it may be deduced that $$\tan \beta = \frac{x1}{\frac{X}{2\tan(F/2)}} = 2\tan(F/2)x1/X.$$

Based on the above deduction, the azimuthal angle α of the target object Z relative to the plane X and the azimuthal angle β of the target object Z relative to the plane Y may be determined. After the two azimuthal angles are determined, the terminal may start up the ranging radar, and send the azimuthal angle α and the azimuthal angle β to the ranging radar. The ranging radar may send the radar signal to all area covered by an antenna radiation angle according to an instruction of the terminal, the radar signal reflected from the area defined by the azimuthal angle α and the azimuthal angle β may be received at a fixed point, and the reference distance between the target object Z and the terminal may be determined according to a transmission time of the radar signal and a receiving time of the radar signal reflected from the area defined by the azimuthal angle α and the azimuthal angle β.

At block 202, a photographing focus of the camera module is adjusted to a position where the target object locates according to the reference distance.

For example, after the reference distance between the target object and the terminal is determined, the terminal may instruct the camera module to perform zooming, that is, to adjust the photographing focus, such that the photographing focus is adjusted to the position where the target object locates.

In the technical solution in aspects of the present disclosure, the ranging radar provided in the terminal may determine the reference distance between the target object and the camera module fast and accurately, such that the terminal may employ the reference distance to perform the focus adjustment, thus improving accuracy and efficiency of the focus adjustment. At the same time, the ranging radar may measure a reference distance between the camera module and any object within a viewing angle range of the camera module. Therefore, the terminal may perform focusing on any object within the viewing angle range, thus improving flexibility and practicability of focusing.

Figure 3:
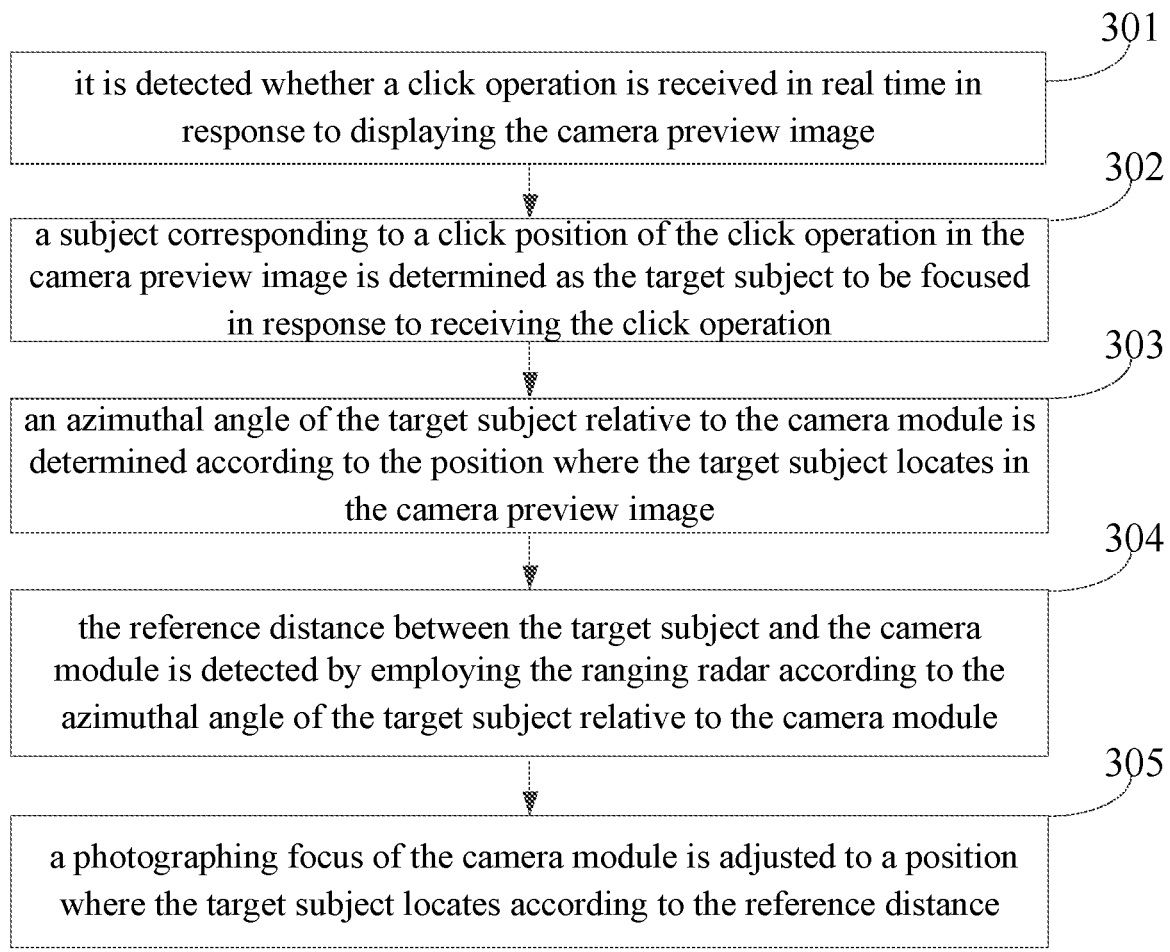
FIG. 3 illustrates a flow chart of a focusing method according to an exemplary aspect of the present disclosure.

FIG. 3 illustrates a flow chart of a focusing method according to an exemplary aspect of the present disclosure, an execution subject of which is a terminal. As illustrated in FIG. 3, the method includes acts in blocks 301-305 as described in followings.

At block 301, it is detected whether a click operation is received in real time in response to displaying the camera preview image.

At block 302, an object corresponding to a click position of the click operation in the camera preview image is determined as the target object to be focused in response to receiving the click operation.

At block 303, an azimuthal angle of the target object relative to the camera module is determined according to the position where the target object locates in the camera preview image.

At block 304, the reference distance between the target object and the camera module is detected by employing the ranging radar according to the azimuthal angle of the target object relative to the camera module.

At block 305, a photographing focus of the camera module is adjusted to a position where the target object locates according to the reference distance.

With the focusing method in aspects of the present disclosure, the ranging radar provided in the terminal may determine the reference distance between the target object and the camera module fast and accurately, such that the terminal may employ the reference distance to perform the focus adjustment, thus improving accuracy and efficiency of the focus adjustment. At the same time, the ranging radar may measure a reference distance between the camera module and any object within a viewing angle range of the camera module. Therefore, the terminal may perform focusing on any object within the viewing angle range, thus improving flexibility and practicability of focusing.

Aspects of an apparatus of the present disclosure are described below, which may be configured to execute the aspects of the method of the present disclosure.

Figure 4A:
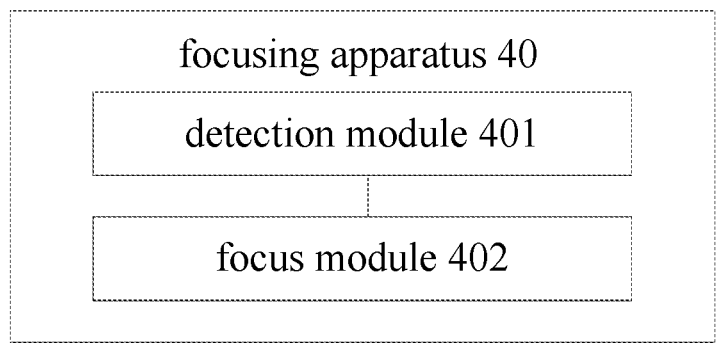
FIG. 4A illustrates a block diagram of a focusing apparatus according to an exemplary aspect of the present disclosure.

FIG. 4A illustrates a block diagram of a focusing apparatus 40 according to an exemplary aspect of the present disclosure. The apparatus 40 may be implemented as a part or all of an electronic device in a form of software, hardware or a combination thereof. As illustrated in FIG. 4A, the focusing apparatus 40 includes a detection module 401 and a focus module 402.

The detection module 401 is configured to detect a reference distance between a target object to be focused and a camera module provided in the terminal by employing a ranging radar provided in the terminal.

The focus module 402 is configured to adjust a photographing focus of the camera module to a position where the target object locates according to the reference distance.

Figure 4B:
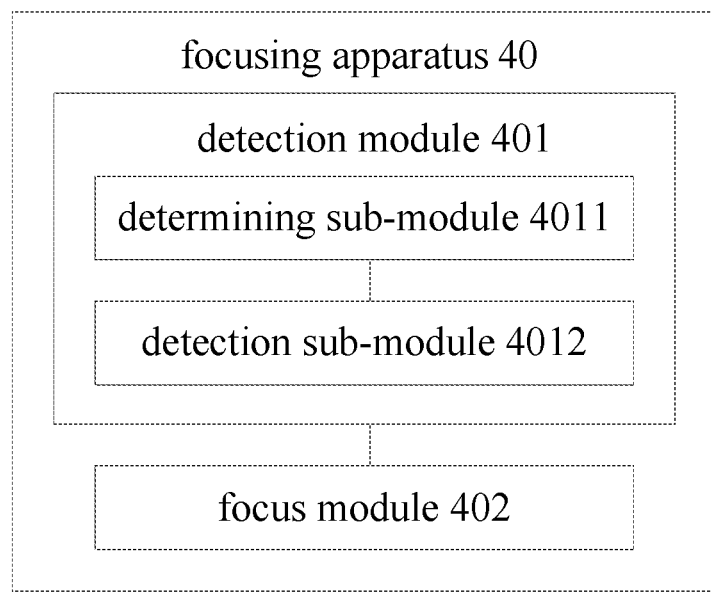
FIG. 4B illustrates a block diagram of a focusing apparatus according to an exemplary aspect of the present disclosure.

In an aspect, as illustrated in FIG. 4B, the detection module 401 includes: a determining sub-module 4011 and a detection sub-module 4012.

The determining sub-module 4011 is configured to determine the target object in a camera preview image displayed in the terminal.

The detection sub-module 4012 is configured to detect the reference distance between the target object and the camera module by employing the ranging radar according to a position where the target object locates in the camera preview image.

Figure 4C:
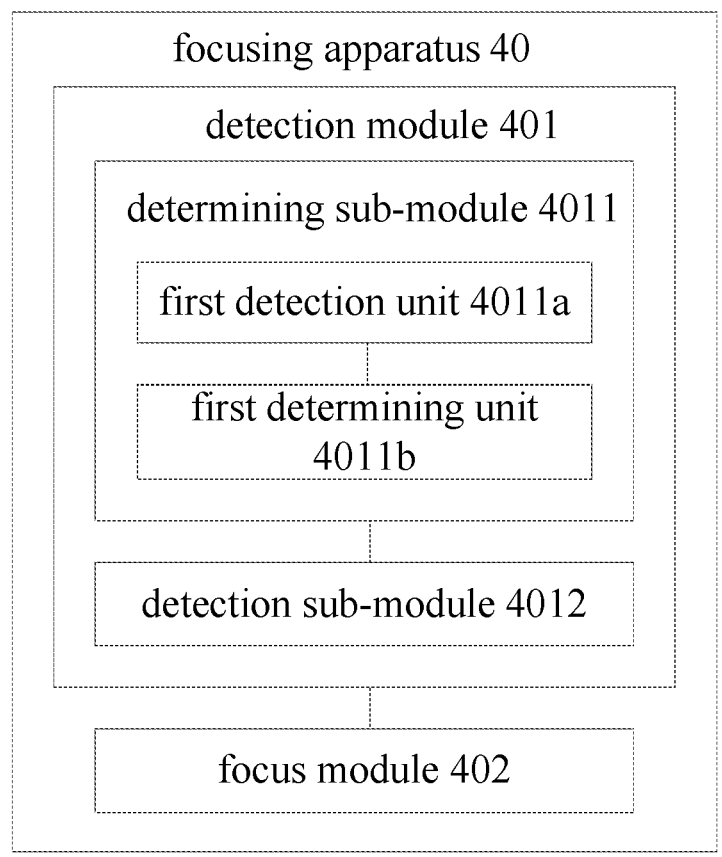
FIG. 4C illustrates a block diagram of a focusing apparatus according to an exemplary aspect of the present disclosure.

In an aspect, as illustrated in FIG. 4C, the determining sub-module 4011 includes: a first detection unit 4011a and a first determining unit 4011b.

The first detection unit 4011a is configured to detect whether a click operation is received in response to displaying the camera preview image.

The first determining unit 4011b is configured to determine an object corresponding to a click position of the click operation in the camera preview image as the target object in response to receiving the click operation.

Figure 4D:
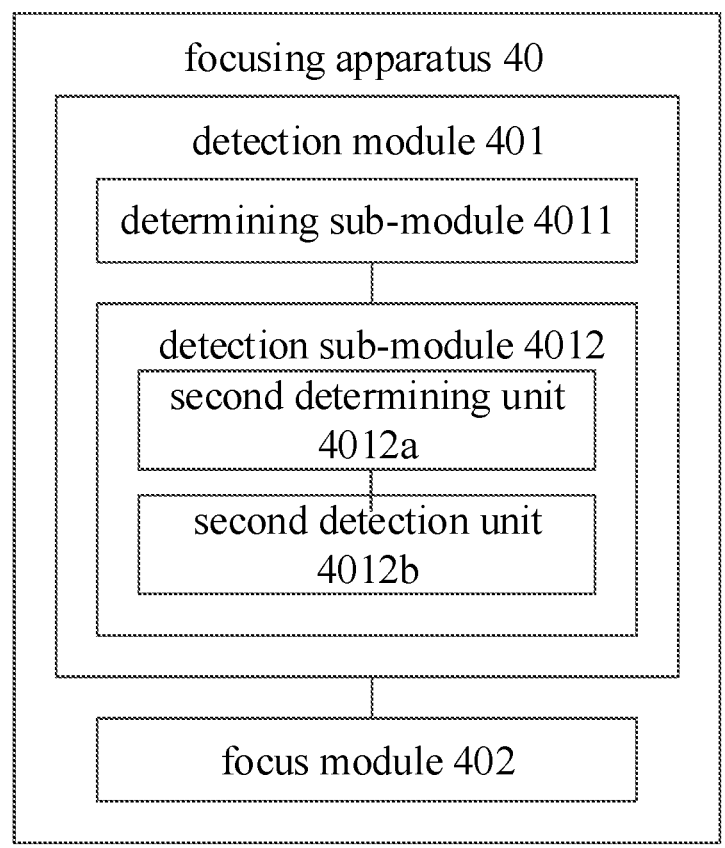
FIG. 4D illustrates a block diagram of a focusing apparatus according to an exemplary aspect of the present disclosure.

In an aspect, as illustrated in FIG. 4D, the detection sub-module 4012 includes: a second determining unit 4012a and a second detection unit 4012b.

The second determining unit 4012a is configured to determine an azimuthal angle of the target object relative to the camera module according to the position where the target object locates in the camera preview image.

The second detection unit 4012b is configured to detect the reference distance between the target object and the camera module by employing the ranging radar according to the azimuthal angle of the target object relative to the camera module.

With the focusing apparatus in aspects of the present disclosure, the ranging radar provided in the terminal may determine the reference distance between the target object and the camera module fast and accurately, such that the terminal may employ the reference distance to perform the focus adjustment, thus improving accuracy and efficiency of the focus adjustment. At the same time, the ranging radar may measure a reference distance between the camera module and any object within a viewing angle range of the camera module. Therefore, the terminal may perform focusing on any object within the viewing angle range, thus improving flexibility and practicability of focusing.

Aspects of the present disclosure provide a focusing apparatus. The focusing apparatus includes a processor and a memory configured to store processor executable instructions.

The processor is configured to detect a reference distance between a target object to be focused and a camera module provided in the terminal by employing a ranging radar provided in the terminal; and to adjust a photographing focus of the camera module to a position where the target object locates according to the reference distance.

In an aspect, the above processor may also be configured to: determine the target object in a camera preview image displayed in the terminal; and detect the reference distance between the target object and the camera module by employing the ranging radar according to a position where the target object locates in the camera preview image.

In an aspect, the above processor may also be configured to: detect whether a click operation is received in response to displaying the camera preview image; and determine an object corresponding to a click position of the click operation in the camera preview image as the target object in response to receiving the click operation.

In an aspect, the above processor may also be configured to: determine an azimuthal angle of the target object relative to the camera module according to the position where the target object locates in the camera preview image; and detect the reference distance between the target object and the camera module by employing the ranging radar according to the azimuthal angle of the target object relative to the camera module.

With the focusing apparatus in aspects of the present disclosure, the ranging radar provided by the terminal may determine the reference distance between the target object and the camera module fast and accurately, such that the terminal may employ the reference distance to perform the focus adjustment, thus improving accuracy and efficiency of the focus adjustment. At the same time, the ranging radar may measure a reference distance between any object within a viewing angle range of the camera module and the camera module. Therefore, the terminal may perform focusing on any object within the viewing angle range, thus improving flexibility and practicability of focusing.

Figure 5:
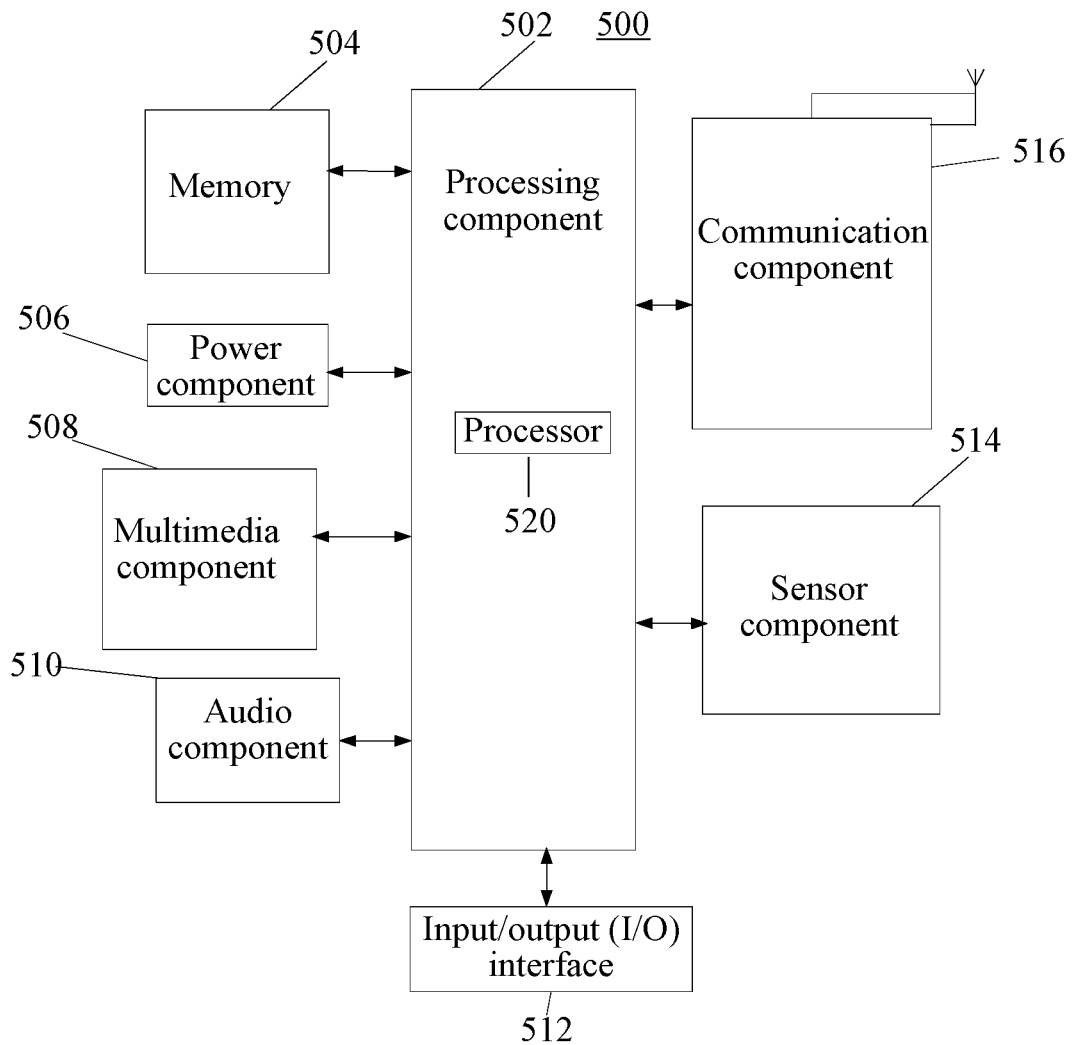
FIG. 5 illustrates a block diagram of a focusing apparatus according to an exemplary aspect of the present disclosure.

FIG. 5 is a block diagram illustrating a focusing apparatus 50 according to an exemplary aspect of the present disclosure. The apparatus 50 may be applied to a terminal. For example, the apparatus 50 may be a mobile phone, a computer, a digital broadcasting terminal, message sending and receiving equipment, a game controller, a tablet device, a medical device, fitness equipment, a personal digital assistant or the like.

The apparatus 50 may include one or more of the following components: a processing component 502, a memory 504, a power component 506, a multimedia component 508, an audio component 510, an input/output (I/O) interface 512, a sensor component 514, and a communication component 516.

The processing component 502 generally controls overall operations of the apparatus 50, such as the operations associated with display, telephone calls, data communications, camera operations, and recording operations. The processing component 502 may include one or more processors 520 to execute instructions to perform all or part of the operations in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the apparatus 50. Examples of such data include instructions for any applications or methods operated on the apparatus 50, contacting data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 50. The power component 506 may include a power management system, one or more power sources, and any other components associated with the generation, management, and distribution of power in the apparatus 50.

The multimedia component 508 includes a screen providing an output interface between the apparatus 50 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 508 includes a front camera and/or a rear camera. The front camera and the rear camera may receive an external multimedia datum while the apparatus 50 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the apparatus 50 is in an operation mode, such as a call mode, a recording mode, and a voice recognition mode. The received audio signal may be further stored in the memory 504 or transmitted via the communication component 516. In some aspects, the audio component 510 further includes a speaker to output audio signals.

The I/O interface 512 provides an interface between the processing component 502 and peripheral interface modules, such as a keyboard, a click wheel, buttons, and the like.

The buttons may include, but are not limited to, a home button, a volume button, a starting button, and a locking button.

The sensor component 514 includes one or more sensors to provide status assessments of various aspects of the apparatus 50. For instance, the sensor component 514 may detect an open/closed status of the apparatus 50, relative positioning of components, e.g., the display and the keypad of the apparatus 50, a change in position of the apparatus 50 or a component of the apparatus 50, a presence or absence of user contacting with the apparatus 50, an orientation or an acceleration/deceleration of the apparatus 50, and a change in temperature of the apparatus 50. The sensor component 514 may include a proximity sensor configured to detect the presence of nearby objects without any physical contact. The sensor component 514 may also include a light sensor, such as a CMOS or CCD image sensor, for use in imaging applications. In some aspects, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 50 and other devices. The apparatus 50 can access a wireless network based on a communication standard, such as Wi-Fi, 2G, or 3G, or a combination thereof. In one exemplary aspect, the communication component 516 receives a broadcast signal or broadcast associated information from an external broadcast management system via a broadcast channel. In one exemplary aspect, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary aspects, the apparatus 50 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more exemplary aspects, there is also provided a non-transitory computer-readable storage medium including instructions, such as the memory 504 including instructions. The above instructions may be executed by the processor 520 in the apparatus 50 to perform the above methods. For example, the non-transitory computer-readable storage medium may be a ROM, a RAM, a CD-ROM, a magnetic tape, a floppy disc, an optical data storage device, and the like.

Aspects of the present disclosure provide a non-transitory computer-readable storage medium. When instructions in the storage medium are executed by a processor in the apparatus 50, the apparatus 50 is caused to execute the above focusing method. The method includes: detecting a reference distance between a target object to be focused and a camera module provided in the terminal by employing a ranging radar provided in the terminal; and adjusting a photographing focus of the camera module to a position where the target object locates according to the reference distance.

In an aspect, detecting the reference distance between the target object to be focused and the camera module provided in the terminal by employing the ranging radar provided in the terminal includes: determining the target object in a camera preview image displayed in the terminal; and detecting the reference distance between the target object and the camera module by employing the ranging radar according to a position where the target object locates in the camera preview image.

In an aspect, determining the target object in the camera preview image displayed in the terminal includes: detecting whether a click operation is received in response to displaying the camera preview image; and determining an object corresponding to a click position of the click operation in the camera preview image as the target object in response to receiving the click operation.

In an aspect, detecting the reference distance between the target object and the camera module by employing the ranging radar according to the position where the target object locates in the camera preview image, includes: determining an azimuthal angle of the target object relative to the camera module according to the position where the target object locates in the camera preview image; and detecting the reference distance between the target object and the camera module by employing the ranging radar according to the azimuthal angle of the target object relative to the camera module.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure disclosed herein. The present disclosure is intended to cover any variations, uses, or adaptations of the present disclosure following the general principles of the present disclosure and includes common knowledge or customary practice in the art which are not described herein. The specification and aspects are considered as exemplary only, with a true scope and spirit of the present disclosure being indicated by the following claims.

It will be appreciated that the present disclosure is not limited to the exaction construction that has been described above and illustrated in the accompanying drawings, and that various modifications and changes can be made without departing from the scope thereof. It is intended that the scope of the present disclosure only be limited by the appended claims.

What is claimed is:

1. A terminal, comprising:
a ranging radar configured to determine a target object to be focused in a camera preview image displayed in the terminal and to detect a reference distance between the target object and a camera module provided in the terminal based on a position where the target object is located in the camera preview image, wherein an antenna radiation angle of the ranging radar covers a viewing angle of the camera module, and
wherein the camera module is configured to adjust a photographing focus of the camera module to a position where the target object is located based on the reference distance,
wherein the ranging radar determines the target object by performing acts of:

detecting whether a click operation is received in response to displaying the camera preview image; and determining an object corresponding to a click position of the click operation in the camera preview image as the target object in response to receiving the click operation; and the ranging radar detects the reference distance by performing acts of:

determining an azimuthal angle α of the target object relative to plane X and an azimuthal angle β of the target object relative to plane Y based on the position where the target object is located in the camera preview image, wherein the plane X and the plane Y are orthogonal in a central axis of the camera module; and detecting the reference distance between the target object and the camera module by employing the ranging radar based on the azimuthal angle α and the azimuthal angle β.

2. The terminal of claim 1, wherein a distance between the ranging radar and the camera module is less than or equal to a preset distance threshold.

3. The terminal of claim 1, wherein the ranging radar is a millimeter wave radar, and the millimeter wave radar is configured to send a radar signal via a frequency modulation continuous wave.

4. The terminal of claim 3, wherein a frequency of the radar signal sent by the ranging radar is greater than or equal to 20 Hz, and less than or equal to 70 Hz.

5. The terminal of claim 3, wherein a bandwidth of the radar signal sent by the ranging radar is less than or equal to 3 Hz.

6. The terminal of claim 1, wherein determining the azimuthal angle α of the target object relative to the plane X and the azimuthal angle β of the target object relative to the plane Y based on the position where the target object is located in the camera preview image, wherein the plane X and the plane Y are orthogonal in a central axis of the camera module; and detecting the reference distance between the target object and the camera module by employing the ranging radar based on the azimuthal angle α and the azimuthal angle β comprises:

establishing a coordinate system with an axis X and an axis Y, wherein the plane X is formed by the axis X and the central axis of the camera module, the plane Y is formed by the axis Y and the central axis of the camera module, the central axis of the camera module is vertical to a plane formed by the axis X and the axis Y;

determining a line S connecting the target object and a center of the camera module;

mapping the line S to the plane X and the plane Y, determining an angle between the plane X and a line mapped to the plane V from the line S as the azimuthal angle β, and determining an angle between the plane Y and a line mapped to the plane X from the line S as the azimuthal angle α;

receiving the azimuthal angle α and the azimuthal angle β by the ranging radar, sending a radar signal to an area covered by an antenna radiation angle according to an instruction of the terminal, and receiving the radar signal reflected from an area defined by the azimuthal angle α and the azimuthal angle β; and determining the reference distance between the target object and the terminal based on a transmission time of the radar signal and a receiving time of the radar signal reflected from the area defined by the azimuthal angle α and the azimuthal angle β.

7. A method for focusing, applied to a terminal, the method comprising:

detecting a reference distance between a target object to be focused and a camera module provided in the terminal by employing a ranging radar provided in the terminal; and adjusting a photographing focus of the camera module to a position where the target object is located based on the reference distance, wherein detecting the reference distance comprises:

determining the target object in a camera preview image displayed in the terminal; and detecting the reference distance between the target object and the camera module by employing the ranging radar based on a position where the target object is located in the camera preview image, wherein determining the target object in the camera preview image comprises:

detecting whether a click operation is received in response to displaying the camera preview image; and determining an object corresponding to a click position of the click operation in the camera preview image as the target object in response to receiving the click operation, and wherein detecting the reference distance comprises:

determining an azimuthal angle α of the target object relative to plane X and an azimuthal angle β of the target object relative to plane Y based on the position where the target object is located in the camera preview image, n the plane X and the plane Y are orthogonal in a central axis of the camera module; and detecting the reference distance between the target object and the camera module by employing the ranging radar based on the azimuthal angle α and the azimuthal angle β.

8. The method of claim 7, wherein determining the azimuthal angle α of the target object relative to the plane X and the azimuthal angle β of the target object relative to the plane Y based on the position where the target object is located in the camera preview image, wherein the plane X and the plane Y are orthogonal in a central axis of the camera module; and detecting the reference distance between the target object and the camera module by employing the ranging radar based on the azimuthal angle α and the azimuthal angle β comprises:

establishing a coordinate system with an axis X and an axis Y, wherein the plane X is formed by the axis X and the central axis of the camera module, the plane Y is formed by the axis Y and the central axis of the camera module, the central axis of the camera module is vertical to a plane formed by the axis X and the axis Y;

determining a line S connecting the target object and a center of the camera module;

mapping the line S to the plane X and the plane Y, determining an angle between the plane X and a line mapped to the plane Y from the line S as the azimuthal angle β, and determining an angle between the plane Y and a line mapped to the plane X from the line S as the azimuthal angle α;

receiving the azimuthal angle α and the azimuthal angle β by the ranging radar, sending a radar signal to an area covered by an antenna radiation angle according to an instruction of the terminal, and receiving the radar signal reflected from an area defined by the azimuthal angle α and the azimuthal angle β; and determining the reference distance between the target object and the terminal based on a transmission time of the radar signal and a receiving time of the radar signal reflected from the area defined by the azimuthal angle α and the azimuthal angle β.

9. A non-transitory computer-readable storage medium having instructions stored thereon, which when executed by a processor of a terminal, cause the terminal to perform the method of claim 7.

10. An apparatus for focusing, comprising:
a processor; and
a memory storing instructions executable by the processor,
wherein the processor is configured to:
determine a target object to be focused in a camera preview image displayed in the terminal and to detect a reference distance between the target object and a camera module based on a position where the target object is located in the camera preview image; and
adjust a photographing focus of the camera module to a position where the target object is located based on the reference distance,
wherein the processor determines the target object by performing acts of:
detecting whether a click operation is received in response to displaying the camera preview image; and
determining an object corresponding to a click position of the click operation in the camera preview image as the target object in response to receiving the click operation; and/or
the processor detects the reference distance by performing acts of:
determining an azimuthal angle α of the target object relative to plane X and an azimuthal angle β of the target object relative to plane Y based on the position where the target object is located in the camera preview image, wherein the plane X and the plane Y are orthogonal in a central axis of the camera module; and
detecting the reference distance between the target object and the camera module by employing the ranging radar based on the azimuthal angle α and the azimuthal angle β.

11. The apparatus of claim 10, wherein determining the azimuthal angle α of the target object relative to the plane X and the azimuthal angle β of the target object relative to the plane Y based on the position where the target object is located in the camera preview image, wherein the plane X and the plane Y are orthogonal in a central axis of the camera module; and detecting the reference distance between the target object and the camera module by employing the ranging radar based on the azimuthal angle α and the azimuthal angle β comprises:

establishing a coordinate system with an axis X and an axis Y, wherein the plane X is formed by the axis X and the central axis of the camera module, the plane Y is formed by the axis Y and the central axis of the camera module, the central axis of the camera module is vertical to a plane formed by the axis X and the axis Y;

determining a line S connecting the target object and a center of the camera module;

mapping the line S to the plane X and the plane Y, determining an angle between the plane X and a line mapped to the plane Y from the line S as the azimuthal angle β, and determining an angle between the plane Y and a line mapped to the plane X from the line S as the azimuthal angle α;

receiving the azimuthal angle α and the azimuthal angle β by the ranging radar, sending a radar signal to an area covered by an antenna radiation angle according to an instruction of the terminal, and receiving the radar signal reflected from an area defined by the azimuthal angle α and the azimuthal angle β; and determining the reference distance between the target object and the terminal based on a transmission time of the radar signal and a receiving time of the radar signal reflected from the area defined by the azimuthal angle α and the azimuthal angle β.

* * * * *